United States Patent [19]

Jannen et al.

[11] 4,141,676
[45] Feb. 27, 1979

[54] PUMP FOR SOIL FUMIGANT

[75] Inventors: Robert L. Jannen, Huntsville; Douglas Johnston, Decatur, both of Ala.

[73] Assignee: John Blue Company Division of Subscription Television, Inc., New York, N.Y.

[21] Appl. No.: 802,902

[22] Filed: Jun. 2, 1977

[51] Int. Cl.² .................... H01C 23/02; F04B 25/00
[52] U.S. Cl. ................... 417/539; 92/133; 111/6; 111/7.2
[58] Field of Search ............ 417/454, 472, 534–537, 417/539, 901; 222/309; 111/6, 7.1–7.4

[56] References Cited

U.S. PATENT DOCUMENTS

| 822,379 | 6/1906 | Lockenback | 417/76 |
|---|---|---|---|
| 2,678,541 | 5/1954 | Sheen | 417/472 |
| 2,902,953 | 9/1959 | Young | 111/7.1 |
| 2,933,049 | 4/1960 | Johnston | 417/536 |
| 3,073,256 | 1/1963 | Browne et al. | 417/454 |
| 3,125,963 | 3/1964 | Whitley et al. | 417/568 |
| 3,151,778 | 10/1964 | Olney et al. | 222/309 |
| 3,806,285 | 4/1974 | Sech | 417/454 |
| 3,990,816 | 11/1976 | Kohler | 417/901 |
| 4,031,778 | 6/1977 | Fazekas | 417/539 |

FOREIGN PATENT DOCUMENTS

| 2109589 | 1/1972 | Fed. Rep. of Germany | 92/13.3 |
| 341355 | 1/1931 | United Kingdom | 417/87 |

Primary Examiner—William L. Freeh
Attorney, Agent, or Firm—Cushman, Darby & Cushman

[57] ABSTRACT

A method and apparatus are shown for use in mixing agricultural chemicals for placement through an applicator onto the soil. A fumigant is added to anhydrous ammonia in measured amounts as the ammonia is being injected in the field from the applicator under pressure. The liquid fumigant, which is quite corrosive to some of the aluminum valves and fittings ordinarily used with anhydrous ammonia, is pumped under pressure to be mixed with the ammonia downstream from the aluminum valves and fittings that might be damaged thereby and upstream from the applicator so that a solution or homogeneous mixture of the anhydrous ammonia and fumigant can be delivered to the ground without damage to any equipment because of the corrosive characteristic of the fumigant.

6 Claims, 6 Drawing Figures

PUMP FOR SOIL FUMIGANT

BACKGROUND

Fumigants are added to anhydrous ammonia used as an agricultural fertilizer in order to control the Nitrosomonas bacteria in the soil that would, if not inhibited by the fumigant, convert the nitrogen in ammonia to a nitrate that can be more easily leached away as compared with the less soluble forms of nitrogen. It is desirable to apply the ammonia to the soil in the fall of the year when the farmer has more time available for conditioning the soil. But if the conversion of ammonia to the nitrate is not inhibited, the winter precipitation, especially in the warmer climates where the bacterial conversion is faster, permits the valuable nitrogen nutrient to be converted to the nitrate form and leached from the soil. Fumigants applied with the ammonia in the fall season are active to inhibit this bacterial conversion of the ammonia and even though the anhydrous ammonia is spread in the fall, when a fumigant is present, the nitrogen in the ammonia is not subject to the undesired bacterial action and is thus preserved through the winter and into the growing season for assimilation by the spring crops.

One of the more popular fumigants is 2-chloro-6 (trichloromethyl) pyridine available from Dow Chemical Company under the name N-Serve. This chemical is available commercially in a petroleum solvent, normally xylene, that is rather volatile at high ambient temperatures and vaporizes easily if the pressure on the solution is reduced too greatly, as may sometimes happen during the course of the intake cycle of a conventional piston pump.

Since the introduction of N-Serve as an additive to be applied with anhydrous ammonia by mixing the ammonia and N-Serve together in a pressure tank to be applied as a solution to the soil, it has been observed that the resulting mix is corrosive when used in the equipment usually provided for containing and injecting ammonia. The aluminum valves and fittings are damaged by the flow of the resulting solution, including the corrosive fumigant, to the extent that the fittings become unreliable.

BRIEF DESCRIPTION OF THE PRESENT INVENTION

The improvement in agricultural equipment here shown for injecting anhydrous liquid ammonia and N-Serve or a similar corrosive additive together with the ammonia, makes use of a precision pump for delivering a precise quantity of the corrosive additive into the stream of anhydrous ammonia after the ammonia has passed from the storage tank, through the usual aluminum valves and metering means. The corrosive chemical is thus not permitted to come in contact with this aluminum or other sensitive control equipment and is mixed with the anhydrous ammonia downstream thereof as the ammonia flows to an applicator. A precise volume of the N-Serve or otherwise corrosive additive is delivered under pressure into the flowing stream of ammonia just before the stream reaches the applicator to be intimately dispersed through the mass of the anhydrous ammonia. The solution or homogeneous mixture of fumigant and anhydrous ammonia resulting from squirting the corrosive fumigant into the flowing stream of anhydrous ammonia under a spray pressure head may be then injected into the soil during the fall season where the fumigant is effective to control the bacteria so that the nitrogen of the ammonia remains in the soil over the winter and into the spring and is not converted to the nitrate form to be too rapidly leached away.

The fumigant need be supplied in relatively minute quantities of only from about 16 to 32 ounces per acre for distribution to the soil and the anhydrous ammonia serves as a dispersing carrier for the fumigant solution as the mixture is injected into the soil from the applicator. The pump for measuring and feeding the relatively small and precise quantities of needed fumigant to the ammonia is a precision piston pump means driven from a wheel or axle of the vehicle that carries the injection equipment through the field. A drive for a pump adapted to meter a precise volume of liquid to be distributed per unit area of a field being treated, is shown in U.S. Pat. No. 3,282,218 to Bauers, Nov. 1, 1966. As in Bauers, the present invention uses a power take-off from a ground contact wheel to drive the pump to produce the required volume of fumigant per acre.

The stroke of the piston pump of the present invention is made to be adjustable to make it possible to provide for variations in the precise quantity of fumigant to be spread and a double eccentric connection between a piston rod and a drive shaft, as generally shown in U.S. Pat. Nos. 2,592,237 to Bradley, Apr. 8, 1952 and 3,007,349 to Loeber, Nov. 7, 1961, has been adapted to the precision pump of this invention to vary the output quantity of the pump.

Ball type inlet and outlet valve means are a part of the herein disclosed pump mechanism, the inlet ball valve means being operative during the suction stroke of a piston to admit a solution containing the corrosive fumigant to the pump cylinder in a manner to preclude vaporization of the xylene carrier for the fumigant and when the piston stroke is reversed, the inlet valve closes and an outlet ball valve means is opened during the compression stroke to permit fluid to flow from the pump when a sufficiently high pressure is produced to move the liquid into the ammonia flow line against the approximately 100 psi pressure of the ammonia in the injection system. Conventional ball valve inlet and outlet valve means are shown in the U.S. Pat. Nos. 3,116,648 to Arenhold, Jan. 3, 1964; 3,356,036 to Repp, Dec. 5, 1967; 3,527,550 to Flynn, Sept. 8, 1970; 3,698,288 to Sonobe and 3,906,842 to Sonobe, Sept. 23, 1975, but specific details of the ball valve means of the present invention have been provided to accommodate the characteristics of the solution of corrosive fumigant shown herein.

The pump includes a plurality of cylinder and piston means operative to maintain a substantially constant metered flow of corrosive fumigant solution under pressure for mixing with the anhydrous ammonia. The pumping cylinders and piston plungers are fabricated of a material inert to the corrosive fumigant. Suitable sealing means are provided to preclude air leaking into the pump and fluid from escaping. A bypass trap is provided to short circuit any fluid that may escape from the pressure pumping means and prevent it from flowing into the crankcase of the pump that encloses the compound eccentric means, bearings and drive shaft for energizing the pump. Furthermore, any such leakage due to wearing of the seals is made obvious by dribbling the leaking fluid harmlessly from a hole in a cylinder wall in order to warn the operator that adjustment of repairs are needed.

IN THE DRAWINGS

DETAILED DESCRIPTION

Figure 1:
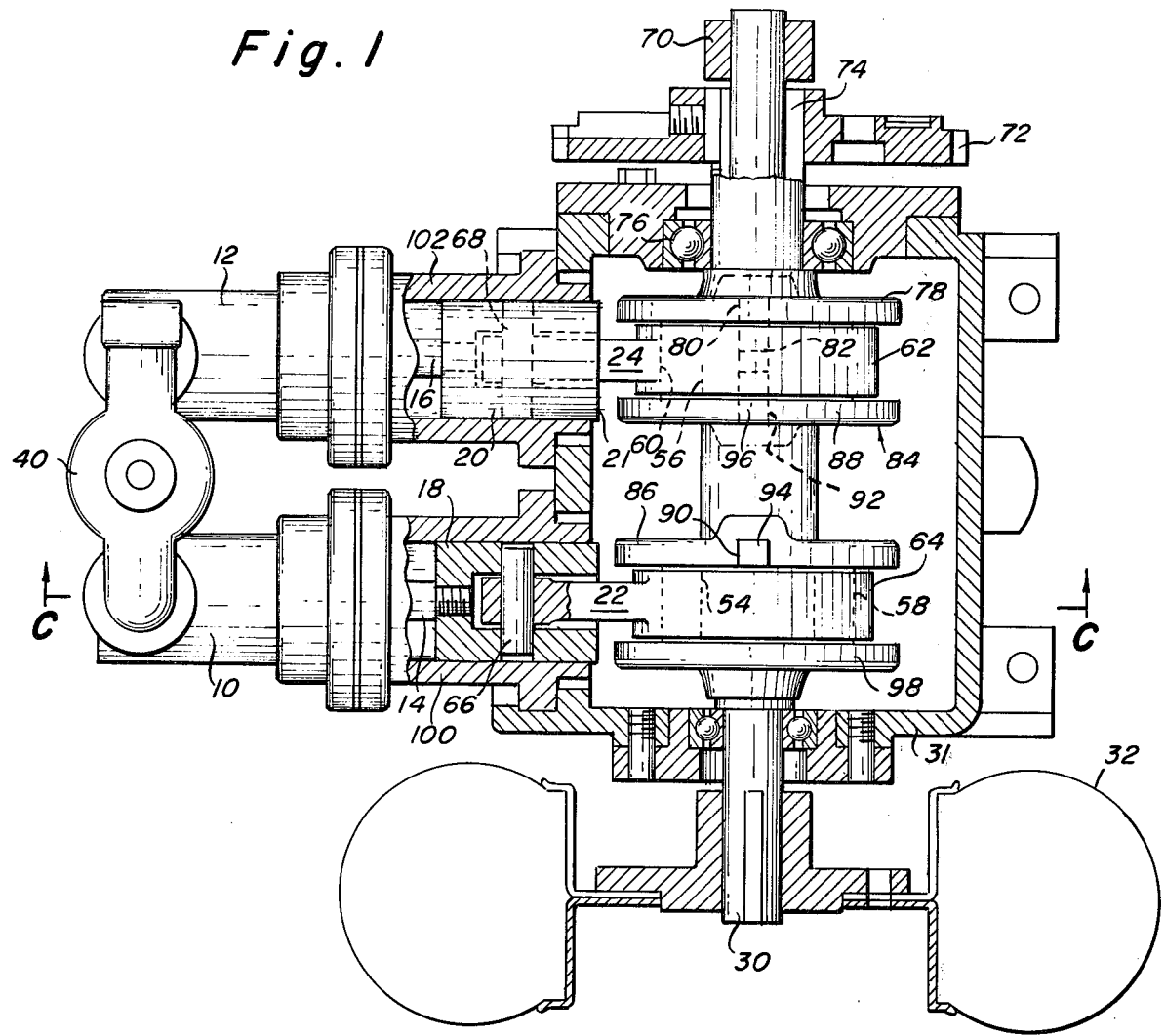
FIG. 1 is a top plan view of the precision pump, partly in section.

The general layout of this precision pump is shown in FIG. 1. Two pumping cylinders 10 and 12 are arranged in a parallel side by side position. Reciprocating piston plungers 14 and 16 are carried on crossheads 18 and 20 that are driven to reciprocate on suitable bearings, the crossheads being pivotally connected to wrist pin bearings on the connecting rods 22 and 24. The opposite ends of the connecting rods have enlarged circular bearings that are rotatably supported on identical compound eccentric means 26 and 28, the smaller eccentrics of which are keyed to a drive shaft 30 as will be explained more fully below. The drive shaft is rotatably supported in bearings carried by the crankcase 31 and the drive shaft is keyed to a power takeoff drive wheel 32 adapted to be engaged against a ground wheel of the vehicle (not shown), upon which the injecting equipment is mounted for movement over the soil to be treated. The drive shaft 30 might be driven directly from the axle of the vehicle's ground wheel by suitable sprocket means, or any other connection could be made with the drive of the transport vehicle, which connection would serve to rotate the drive shaft 30 at a rotary speed proportional at all times to the velocity of the vehicle's movement across the ground. The pump must be driven faster or slower in direct proportion as the vehicle is moved faster or slower to cause more or less fumigant solution to be pumped so that the desired quantity of fumigant per acre, and constantly the same quantity of fumigant per acre, will be pumped in relation to the increment of travel of the vehicle over the field for application of the fertilizer and fumigant to the soil.

Figure 6:
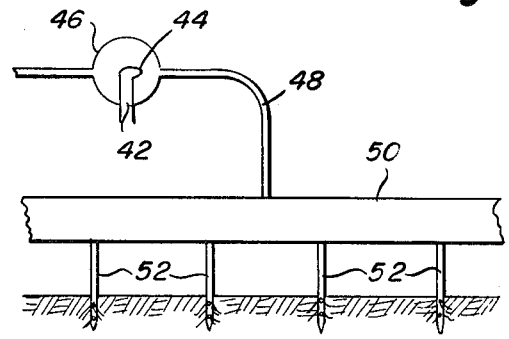
FIG. 6 is a diagrammatic illustration of the infeed means for adding the corrosive fumigant solution to the anhydrous ammonia flowing to the applicator knives and sealers injecting the homogeneous mixture or solution of fumigant and ammonia into the soil.

The pump cylinders 10 and 12 are each provided, respectively, with a ball check inlet valve 34 and outlet valve 36, that will be described more fully below, to admit the liquid fumigant from an inlet header 38 to be metered and pumped by the positive displacement piston plungers that force a measured quantity of liquid fumigant to be pumped with each stroke to pass through the outlet valves 36 into an outlet header 40 for delivery to the conduit 42 shown in FIGS. 5 and 6. The conduit 42 feeds the measured volume of liquid solution of the corrosive fumigant as it is pumped, to a nozzle 44 shown diagrammatically in FIG. 6. The nozzle is disposed in a mixing fitting 46 through which the metered supply of anhydrous ammonia flows under pressure, in the order of about 100 psi. The liquid fumigant is therefore pumped into conduit 42 at a somewhat higher pressure than 100 psi to cause the fumigant solution to enter the ammonia flow in the mixing fitting 46. The fumigant solution and ammonia become intimately dispersed together as they flow through conduit 48 to become homogeneously distributed throughout the mass of the combined liquid stream as it moves onwardly to the manifold 50. The manifold is provided with a series of well-known knives and sealer means 52 for injecting the solution of fumigant and ammonia into the soil so that the fumigant in a controlled amount is placed below the surface of the ground together with the metered anhydrous ammonia.

Depending upon the concentration of the fumigant solution and for other reasons that are all well known, the length of the stroke of each of the piston plungers 14 and 16 may be reset from time to time to vary the volume of the fumigant fluid to be pumped. The stroke of the pistons of the pump may be set to produce a flow volume of the solution of fumigant that produces an injection per acre of from about sixteen to thirty-two ounces of fumigant in the soil. The volume of the commercially available fumigant solution that must be pumped per acre can be calculated to produce such a desired injection rate. A pump having a capacity of from a minimum of 0.00008 part of a gallon to maximum of 0.0008 part of a gallon per revolution can be operated at a sufficiently high r.p.m. to feed the desired quantity of fumigant to the anhydrous ammonia used to fertilize the usual agricultural field crops.

Figure 2:
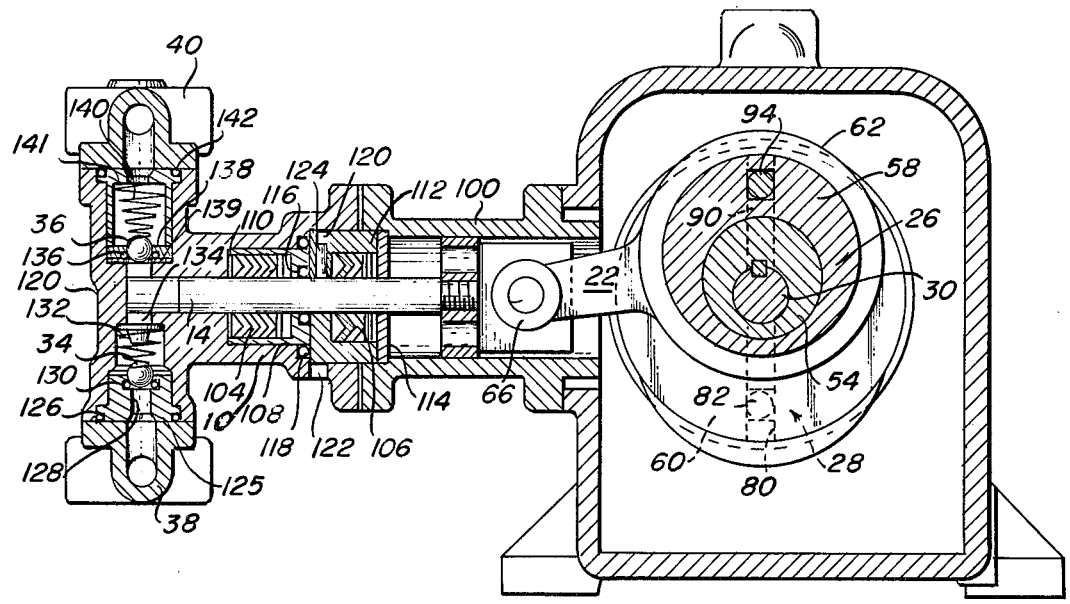
FIG. 2 is a vertical front section taken on line cc of FIG. 1.

The structure provided to reset the stroke of pump plungers 14 and 16 in cylinders 10 and 12 makes use of the compound eccentric means 26 and 28, best seen in FIG. 2. The smaller eccentrics 54 and 56 spaced apart lengthwise along shaft 30 are both keyed to the drive shaft 30 and are set at 180° apart, one relative to the other. Larger eccentrics 58 and 60 are rotatably mounted on the smaller eccentrics. The crankcase ends of connecting rods 22 and 24 are supported on the large eccentrics that rotate within bearings 62 and 64 integral with the piston rods, the opposite ends of the connecting rods being connected to the crossheads 18 and 20 by wrist pin bearings 66 and 68. The rotated position of the larger eccentric relative to the smaller eccentric changes the length of the stroke of the connecting rods 22 and 24 and as best shown in FIG. 2, the larger eccentrics are likewise set apart 180°, one relative to the other, and in this figure, the compound eccentrics 26 and 28 are set for the longest possible piston stroke.

Means are provided to simultaneously adjust the relative rotated positions of the larger eccentrics on the smaller eccentric and relative rotation of eccentrics 58 and 60 from the maximum piston stroke position illustrated through 180° or a half turn, in which relative positions the throw of the small eccentric is turned in a direction that is equal and opposite to the throw of the large eccentric and the amount of eccentricity of the larger and smaller eccentrics are the same whereby in this new half turned position, the eccentrics balance each other out and the piston rod stroke becomes zero so that no reciprocation of the piston rod and piston plunger results.

Figure 3:
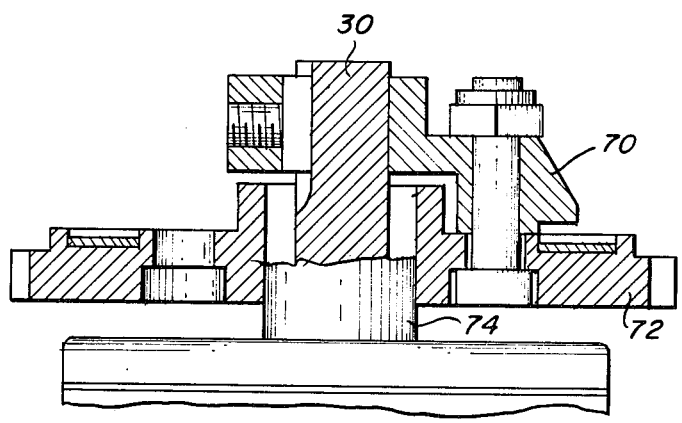
FIG. 3 is a detail side elevation showing the adjusting lever for control of the piston stroke adjusting means.

The relative positions of the large and small eccentrics relative to one another are used to produce a variation in the stroke from a maximum length to a zero length of stroke and all lengths of strokes inbetween are controlled by the manipulation of stroke setting arm 70 shown in FIGS. 1 and 3 with respect to a cooperating flange 72. Arm 70 is keyed to drive shaft 30 and is preferably fixed to the shaft in a manner to indicate the radial line of the maximum throw of the small eccentrics 54 and 56 that are also keyed to shaft 30. The flange 72 is keyed to the stroke setting sleeve bearing 74 that is rotatably mounted on shaft 30. The stroke setting sleeve is in turn rotatably carried in bearing means 76 supported in a wall of crankcase 31. The stroke setting sleeve has an integral bearing flange 78 positioned within the crankcase that provides a bearing surface disposed at right angles to the axis of the drive shaft 30 for locating the position of one face of the compound eccentric 28 along shaft 30. Referring to FIG. 2, the face of the bearing flange 78 adjacent the large eccentric is provided with a radially disposed slot 80 to receive the square head of a pin 82 that is rotatably seated in a bearing provided in the side face of the large eccentric 60.

The two compound eccentrics are held spaced apart along shaft 30 by a spool shaped stroke transfer spacer 84 shown in FIG. 1, that is rotatably mounted on the drive shaft. The transfer spacer has flanges 86 and 88 that provide side face bearing surfaces for compound eccentrics 26 and 28, respectively, these bearing surfaces each having slots 90 and 92 milled therein extending halfway across the face radially from the outside periphery of the flange to the bore for shaft 30. The two half slots on the respective bearing faces of flanges 86 and 88 are disposed 180° apart and these slots receive the square beads of bearing pins 94 and 96 that are rotatably carried in the bearing faces of the large eccentrics 58 and 60 opposite the slotted faces of the stroke transfer spacer. The compound eccentric 26 is spaced from the crankcase wall at the front end of the crankcase by a spacer 98 that is rotatably carried on shaft 30 to float between the crankcase wall and the eccentric.

The mechanism above described is operative to simultaneously rotatably adjust the relative positions of the two large eccentrics 58 and 60 relative to the smaller eccentrics 54 and 56 keyed to shaft 30. Whenever the stroke setting arm 70 is moved over the stroke setting flange 72 to a new position that may be indicated on a suitable dial fixed on the face of the stroke setting flange, the shaft 30 is turned with the arm relative to the stroke setting sleeve 74. The relative motion produced between shaft 30 and sleeve 74 acting through pin 82 turns large eccentric 60 relative to small eccentric 56 about which it rotates. In FIGS. 1 and 2, the eccentrics are shown positioned to produce the longest stroke possible for piston plungers 14 and 16 so that adjustment away from this position shortens the stroke. To shorten the stroke, the eccentric 60 is rotated relative to eccentric 56 and then acting through pin 96, turns the stroke transfer spacer 84 and through pin 94 on its opposite face and set 180° away from pin 96 turns the other large eccentric 58 appropriately about the small eccentric 54. In this manner, by adjusting the stroke arm relative to the stroke setting flange, large eccentrics 58 and 60 are both turned simultaneously to rotate about the smaller eccentrics 54 and 56. The disposition of the half slots 90 and 92 at 180° apart through their cooperating pins 94 and 96 cause the large eccentrics to be rotated an equal number of degrees apart around their respective smaller eccentrics so that the pistons are always driven through their suction and compression strokes in alternating 180° sequence with exactly the same length of strokes.

The pumping action is produced by reciprocating the piston plungers 14 and 16 in cylinders 10 and 12. The piston plungers are threaded into crossheads 18 and 20 driven by the connecting rods 22 and 24. The crossheads have a sliding bearing in fixed crosshead guides 100 and 102 supported on the crankcase 31. The piston plungers 14 and 16 are elongated cylindrical members that have a precision fit in the cylinders. The cylinders 10 and 12 are bolted onto crosshead guides 100 and 102 and the plungers reach into the cylinder with a fit such that the clearance between the end of the plunger and the inner wall at the end of the cylinder at full stroke is from 1/32 to 1/16 of an inch.

The piston plungers, as best seen in FIG. 2, are provided with a side wall packing designed to eliminate clearance volume within the pumping cylinder insofar as possible to ensure accuracy while efficiently sealing the pumping system against air leaks. To accomplish this and to also provide against leakage of any of the corrosive fluid into the crankcase and to provide a visual signal in the event that the packings should begin to wear out, a pair of Vee type packings 104 and 106 are used in spaced apart position lengthwise along the piston plunger. Packing 104 is supported in a sleeve 108 that precisely fills the seat provided for it in the cylinder and this Vee packing is held properly tensioned to press against the side wall of the piston plunger by a selection of a thin shim means 110. The use of shim means to fill the space between the end of the Vee packing and the sleeve eliminates the possibility of a gas pocket forming over the packing that might introduce inaccuracies in the metering action of the pump. If a gas pocket were present, it would expand on the suction stroke and compress on the compression stroke and even though having only a small effect with each pumping cycle, such a situation is to be avoided because the cumulative result would produce variations in the volume of liquid pumped.

The sleeve 108 is sealed against the end of a second sleeve 112 that contains the second Vee seal 106 that protects the crankcase. The second sleeve is supported on a spacer washer 114 that is seated in a recess formed in the end of the crosshead guide 100 and shim means may also be used to tension this seal against the side walls of the piston plunger. The sleeve 108 is sealed against sleeve 112 by a pair of O-ring seals 116 and 118. The sleeve 112 has a groove 120 formed around its periphery and the groove communicates with a hole 122 drilled through the wall of the cylinder. The groove is connected by a drilled hole 124 to the bearing bore in the sleeve through which the piston plunger reciprocates so that if any of the fluid being pumped does leak past a worn Vee seal 104, it will collect in groove 120 and flow by gravity to dribble out of hole 122 where it will be seen to give warning of the condition of the seal in that cylinder. The crankcase 31 is vented to the atmosphere and since both sides of the seal 106 are at atmospheric pressure, there is no substantial pressure on Vee seal 106 and thus little occasion for wear, so the crankcase is well protected against the possible leakage of the corrosive fluid being pumped through cylinders 10 and 12. The O-ring seal 116 precludes the entry of air into the pump cylinder during the suction stroke of the piston plunger when the Vee seal is slightly less effective.

An identical seal structure and arrangement of the packing elements is provided for piston plunger 16. Similarly, a dribble hole is provided in the cylinder 12.

Figure 4:
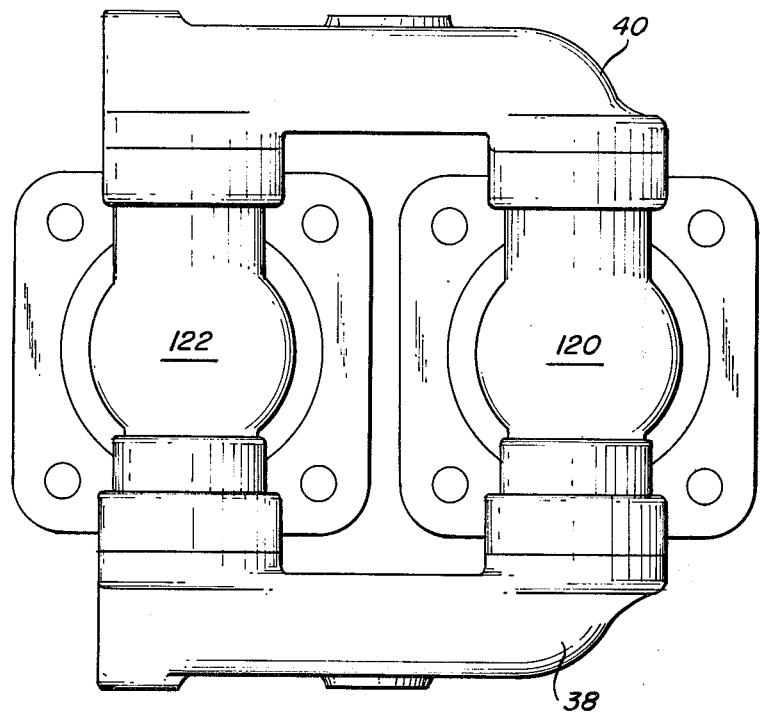
FIG. 4 is an end view of FIG. 2 of the pump showing the housing for the inlet and outlet valves and the inlet and outlet manifolds.

The fluid to be pumped flows to the cylinders 10 and 12 through identical inlet valves 34, one of which is shown in FIG. 2, positioned between the inlet header 38 and each of the cylinders 10. Identical outlet valves 36 are positioned between cylinders 10 and 12 and outlet header 40. These one-way ball valves 34 and 36 are each supported in valve housings 120 and 122 as shown in FIGS. 2 and 4. The housings are formed integral with cylinders 10 and 12. The housings each have a passage drilled through them in a direction perpendicular to the longitudinal axis of the cylinders to provide support shoulders for the valves and flow passages between the headers, through the valves and into the cylinders. At the inlet valve end, the housing 120, as shown in FIG. 2, is provided with a chamber to receive a sleeve 125 that is sealed against the housing and inlet passage 38 with O-ring 126. The sleeve 125 is provided with an inflow passage 128 and an undercut groove for supporting an O-ring 130 that serves as a seat for the inlet ball valve 34. A lightweight conical suction or inlet valve spring 132 engages between the ball and an inner shoulder in the inlet passage to the cylinder to hold the ball lightly pressed onto O-ring 130 and the spring also holds a conically shaped ball stop means 134 in position to engage and support the ball during the suction stroke to prevent the ball from crushing and damaging spring 132. The spacer has suitable apertures in its conical side walls to permit the infeed of liquid to cylinder 10 during the completion of the suction stroke when the ball may be seated on the open end of the spacer.

It is to be noted that the use of a lightweight spring 132 to hold the intake valve closed, provides an ideal inlet valve means to minimize the change in pressure on the xylene solution on the initiation of the suction stroke. Any sudden reduction in pressure tends to volatilize the xylene and if the change is too great, the xylene may flash to its gaseous state. When the lightweight spring 132 is used on the inlet ball valve, the tendency to flash xylene to its gaseous form is minimized on the suction stroke whereby a more accurate pumping action can be realized. This suction or intake valve construction together with the precision fit of the piston plunger in the cylinder described above, cooperates to minimize the possibility of a gas bubble being present in the cylinder which would otherwise detract from the precision output characteristic of the pump.

When the piston plunger motion is reversed, the compression stroke begins and ball 34 is forced against seat 130 as the pressure in the liquid being pumped builds up and as shown in FIG. 2, ball 36 of the outlet valve is lifted from its engagement on an O-ring seat 136 supported in sleeve 138 positioned adjacent cylinder 10 and sealed with gasket 139. The outlet valve 36 is normally urged to seat against O-ring 136 by a spring 140 that is carried in a spacer sleeve 141. The spacer 141 is fitted into a seat provided in valve housing 120 and is sealed against the outlet header 40 with O-ring 142. The spring 140 is preferably a heavier spring then is provided for the inlet valve and is designed to hold the ball 36 on its seat 136 until a pressure of at least 3 psi over the pressure prevailing in outlet header 40 and conduit 42 is built up in the liquid during the compression stroke. This is desirable in order to keep static pressure from causing a liquid flow through the cylinder into the outlet after the drive has been discontinued in situations where the liquid supply may be above the pump.

Figure 5:
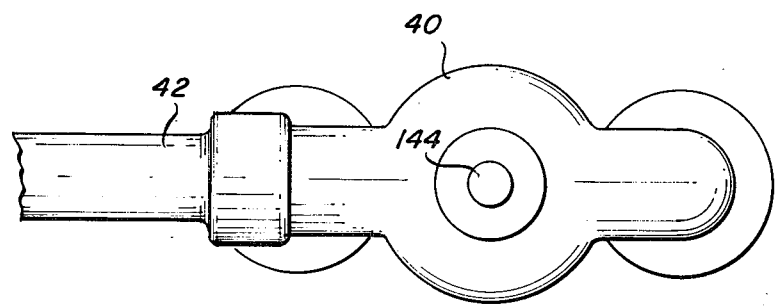
FIG. 5 is a top view showing an outlet manifold.

The inlet and outlet headers 38 and 40 may be made identical and are each adapted to be mounted on the valve housings by a single tie bolt (not shown) passing through bolt holes 144, FIG. 5, provided at the centerpoint of the elements. The single bolt will draw both the headers down snugly onto O-ring seals 126 and 142 of each of the cylinders 10 and 12.

The crankcase 31 may be mounted on a pivoting base member (not shown) so that the pump means may be moved into position to engage wheel 32, for example, on one of the wheels of the transport vehicle. The pump can be mounted in any convenient manner consistent with the drive connection between the pump and the vehicle to achieve the desired quantity laydown per acre of the fumigant as above described.

The various piston plungers, cylinders, valves, springs, valve housings, headers, seals and other elements that come in contact with the corrosive fumigant liquid must be made from materials that are inert with respect to the liquid being pumped. Stainless steel has characteristics that are useful for containing N-Serve but other materials might be required for other liquids.

The pump described above is adapted to pump a liquid such as N-Serve with an accuracy of ± 2% in the quantities indicated. The limited clearance of the piston plunger in the cylinder, together with the Vee seal arrangement, elimination of gas pockets and sealing out air leaks, minimizes the possibility of error occurring due to the presence of gas in the pumping cylinder. These are important elements of a pump designed to pump a liquid solution of xylene which is a highly volatile material. The two cylinder pump structure is quite adequate to provide a substantially constant flow of fumigant liquid under a desirably high pressure to maintain the xylene solution in its liquid form to be mixed in proper proportion with the anhydrous ammonia to be injected into the soil to inhibit bacterial attack on the ammonia. The pump is effectively sealed against the admission of air that might interfere with a proper pumping action and a cylinder and piston plunger packing construction is provided that makes possible the development of the optimum compression of the piston plunger Vee packings to minimize leakage. Further, the structure described above eliminates the possibility of there being any leakage of corrosive fluid into the crankcase and a visual indication of the ultimate wearing of the seals is built into the pump.

The preferred form of the invention has been described herein and modifications thereof may occur to those skilled in the art that will fall within the scope of the following claims.

What is claimed is:

1. A pump for delivering measured quantities of a solution such as a corrosive fumigant into a hose carrying a stream of anhydrous ammonia under as much as 100 psi pressure leading to applicator knives and sealer means having outlets for injecting the mixture of fumigant and ammonia into the soil, said pump comprising at least one pair of cylinder means to receive the liquid to be measured, said cylinder means having inlet and outlet means for the liquid, and a piston means in each of the respective cylinders of said at least one pair of cylinder means, drive means for reciprocating said piston means in said cylinder means, said piston means reciprocating through a measured stroke in its cylinder means through pumping and suction strokes to produce said measured stream flow through said outlet, inlet and outlet valve means movably cooperating with said piston and cylinder means, means to adjust the length of said measured pumping and suction strokes of said piston means, said adjustment of the piston stroke being provided for varying the output of said piston and cylinder means, said drive means for reciprocating said pistons including a drive shaft extending along a longitudinal axis, said piston and cylinder means being spaced apart along said longitudinal axis and being disposed on axes at right angles to said longitudinal axis of the drive shaft, a compound eccentric drive means for each one of said piston means keyed to said drive shaft, each of said eccentric means rotating in its respective plane perpendicular to said longitudinal axis, each of said planes including an axis of said respective cylinder and piston means, connecting rod means each having a bearing supported at one end of said eccentric drive means and drivingly connected to a piston on the other end, each of said compound eccentric drive means including a small eccentric keyed to the drive shaft and a larger eccentric rotatably mounted on the small eccentric, means to rotatably adjust one of said larger eccentrics and then hold that larger eccentric in a relatively fixed rotated position around said smaller eccentric to control the stroke of the piston rod and connecting rod having a bearing supported thereon, a stroke transfer spacer rotatably carried on said drive shaft between each of said compound eccentric means, said spacer having side face bearing surfaces thereon disposed perpendicularly to said longitudinal axis, means disposed between said larger eccentrics and said side bearing surfaces to effect simultaneous adjustment of the other of said larger eccentrics in an equal amount as said one eccentric is rotatably adjusted to cause the length of the stroke of the other connecting rod and piston means to be adjusted an equal amount.

2. A structure as in claim 1 wherein a spool shaped stroke transfer spacer is positioned between said spaced apart compound eccentrics, said compound eccentrics having side faces perpendicular to the axis of said drive shaft and said transfer spacer being concentrically disposed around the drive shaft between said compound eccentric means and side faces on the ends of said spool shaped spacer, said faces being coextensive with the sides of said compound eccentrics, each of the side faces having radially disposed slots cut therein, bearing pins having square heads for sliding in said radially disposed bearing slot cut in the respective side faces of said transfer spacer, each of said large eccentrics having a bearing hole drilled perpendicularly into the side face thereof at the widest part of the eccentric, said pins having rotatable bearing means for engaging in said bearing hole in the side face respectively of each of said large eccentrics, said pins being set 180° apart around the drive shaft, and each of said square bearing heads sliding in said slots as the large eccentric is rotated relative to the small eccentric whereby both of the large eccentrics are adjusted simultaneously and equally around their respective smaller eccentrics to simultaneously adjust the lengths of the stroke of each of the piston means in the same amount.

3. A pump for delivering measured quantities of a solution such as a corrosive and volatile fumigant into a hose carrying a stream of anhydrous ammonia under as much as 100 psi pressure leading to applicator knives and sealer means having outlets for injecting the mixture of fumigant and ammonia into the soil, said pump comprising at least one pair of cylinder means to receive the liquid to be measured, said cylinder means having inlet and outlet means for the liquid, and a piston means in each of the respective cylinders of said at least one pair of cylinder means, each of said pistons being formed as a rod having a constant diameter, drive means for reciprocating said piston means in said cylinder means, said pistons being fitted in said cylinders with limited piston clearance between the piston and cylinder, Vee type packing means for surrounding each of said pistons at the end of each of said cylinders between said drive means and said cylinder, drive means for reciprocating said piston means in said cylinder means, said piston means being reciprocated through a measured stroke in its cylinder means through pumping and suction strokes, inlet and outlet valve means movably cooperating with said piston and cylinder means, said structure being operative whereby the free volume between said piston and cylinder is controlled to provide only a limited clearnace for the respective pistons within their cylinders and the Vee seals cooperating with the pistons to eliminate gas pockets to minimize the occurrence of error when pumping a liquid that tends to volatilize.

4. A structure as in claim 3 wherein said piston means includes a crosshead means, a crankcase for supporting said drive means, slide bearing means for said crosshead means, said slide bearing support being carried integral with said crankcase, a seat in said slide bearing support for a second Vee seal means, shim means carried on said seat and engaging against said second Vee seal means, and said cylinder means being supported in sealed relation from said slide bearing support means.

5. A pump for delivering measured quantities of a solution of a corrosive fumigant into a hose carrying a stream of anhydrous ammonia under as much as 100 psi pressure leading to applicator knives and sealer means having outlets for injecting the mixture of fumigant and ammonia into the soil, said pump comprising cylinder means formed of a material inert to said corrosive fumigant, said cylinder means having an inlet to receive the solution to be pumped, and piston means formed of a material inert to said corrosive fumigant, said piston means being reciprocably driven in said cylinder means through pumping and suction strokes to produce said measured stream flow through said outlet, one-way inlet and outlet valve means movably cooperating with said piston means, said valve means being positioned closely adjacent said inlet and outlet of said cylinder means, respectively, movement of said inlet valve means being controlled by spring means adapted to produce a light pressure against the opening movement of the inlet valve means to minimize a tendency to produce a reduced pressure in the cylinder means when said piston means moves through its suction stroke, said piston means having a precision fit within said cylinder means, means to adjust the length of said respective pumping and suction strokes of said piston means, said adjustment of the piston stroke being provided for varying the output of said piston and cylinder means from a maximum displacement in the order of 0.0008 part of a gallon to 0.00008 part of a gallon per stroke, said piston means fitting said cylinder means whereby to have a minimum clearance between the end of piston means and the end wall of the cylinder when pumping 0.00008 gallons per stroke in order to minimize any inaccuracy in the volume of corrosive solution pumped that might result from the presence of gas in the fluid being pumped, means to provide a liquid seal between said piston and cylinder means, and drive means to reciprocate said piston means through suction and compression strokes in said cylinder means.

6. A structure as in claim 5 wherein said inlet and outlet valve means are carried in said housing and include spring pressed ball valves and seats therefor, said inlet valve means having an O ring seat for the ball in its closed position and a light coil spring to hold the ball sealed, said ball being adapted to move to an open position when the piston means reciprocates on a suction stroke, a spacer to hold the ball in a fixed open position with said spring partially collapsed during completion of the suction stroke.

* * * * *